(12) United States Patent
Villeneuve

(10) Patent No.: US 9,164,352 B2
(45) Date of Patent: Oct. 20, 2015

(54) SYSTEM AND METHOD FOR SYNCHRONIZING LIGHT PULSES AT A SELECTED LOCATION

(75) Inventor: Alain Villeneuve, Mount-Royal (CA)

(73) Assignee: GENIA PHOTONONICS INC., Laval (CA)

(*) Notice: Subject to any disclaimer, the term of this patent is extended or adjusted under 35 U.S.C. 154(b) by 31 days.

(21) Appl. No.: 14/240,866

(22) PCT Filed: Aug. 28, 2012

(86) PCT No.: PCT/CA2012/000795
§ 371 (c)(1),
(2), (4) Date: Feb. 25, 2014

(87) PCT Pub. No.: WO2013/029154
PCT Pub. Date: Mar. 7, 2013

(65) Prior Publication Data
US 2014/0347719 A1    Nov. 27, 2014

Related U.S. Application Data

(60) Provisional application No. 61/573,080, filed on Aug. 29, 2011.

(51) Int. Cl.
| | | |
|---|---|---|
| G02F 1/35 | (2006.01) | |
| H01S 3/10 | (2006.01) | |
| H01S 3/23 | (2006.01) | |
| H01S 3/00 | (2006.01) | |
| H01S 3/11 | (2006.01) | |

(52) U.S. Cl.
CPC ............... *G02F 1/353* (2013.01); *G02F 1/3534* (2013.01); *G02F 1/3536* (2013.01); *H01S 3/0092* (2013.01); *H01S 3/11* (2013.01); *H01S 3/2391* (2013.01); *G02F 2201/20* (2013.01); *H01S 3/10053* (2013.01)

(58) Field of Classification Search
None
See application file for complete search history.

(56) References Cited

U.S. PATENT DOCUMENTS

| | | | |
|---|---|---|---|
| 4,164,373 A | 8/1979 | Johnson et al. | |
| 5,367,305 A | 11/1994 | Voelker et al. | |
| 5,703,314 A | 12/1997 | Meeker | |
| 6,388,782 B1 | 5/2002 | Stephens et al. | |
| 7,027,735 B2 | 4/2006 | Kumar | |
| 7,130,539 B2 | 10/2006 | Shahar et al. | |
| 7,499,151 B2 | 3/2009 | Bao et al. | |
| 8,107,167 B2 | 1/2012 | Galvanauskas et al. | |
| 8,120,778 B2 | 2/2012 | Fermann et al. | |
| 8,144,740 B1 | 3/2012 | Brown et al. | |

(Continued)

FOREIGN PATENT DOCUMENTS

WO    2011038508 A1    4/2011

*Primary Examiner* — Hemang Sanghavi

(57) ABSTRACT

A system (100) for spatially addressing the synchronization of two light pulses (118, 120) having a respective wavelength. The system (100) includes two light sources (110, 114), each one generating one of the light pulses (118, 120) in response to receiving a respective source trigger. The light pulses (118, 120) are combined and then distributed in many light guiding elements (104) in which propagation at the first and second wavelength takes a different amount of time, the differences between the propagation times at the first and second wavelengths differing between the light guiding elements (104). The source triggers are separated from each other by a variable delay in order to cause simultaneous arrival of the first and second pulses (118, 120) at the output of only one of the light guiding elements (104).

19 Claims, 2 Drawing Sheets

(56) References Cited

U.S. PATENT DOCUMENTS

| | | |
|---|---|---|
| 2002/0003641 A1 | 1/2002 | Hall et al. |
| 2003/0058499 A1 | 3/2003 | Reingand et al. |
| 2008/0018903 A1 | 1/2008 | Bao et al. |
| 2009/0303476 A1 | 12/2009 | Kosterev et al. |
| 2013/0050693 A1 * | 2/2013 | Villeneuve et al. ........... 356/301 |

* cited by examiner

SYSTEM AND METHOD FOR SYNCHRONIZING LIGHT PULSES AT A SELECTED LOCATION

The present application claims priority from U.S. Provisional Patent Application Ser. No. 61/573,080 filed on Aug. 29, 2011, the contents of which is hereby incorporated by reference in its entirety.

FIELD OF THE INVENTION

The present invention relates to the general field of optics, and is particularly concerned with a system and a method for synchronizing light pulses at a selected location.

BACKGROUND

There are many applications that require the combination of laser light at two different wavelengths to produce laser light at a third wavelength, which depends on the first two wavelengths. In some of these applications, many light sources are required to produce the laser light at the third wavelength at different spatial locations, which typically requires many different light sources for generating the laser light at the first two wavelengths, or an active component to dispatch to the right location the laser light at the first two wavelengths produced at a central location. Systems for performing these actions are therefore relatively complex, with relatively large costs and relatively large maintenance needs.

Against this background, there exists a need in the industry to provide improved systems and methods for synchronizing light pulses at a selected location. An object of the present invention is therefore to provide such a system and such a method.

SUMMARY OF THE INVENTION

In a broad aspect, the invention provides a system for spatially addressing generation of a non-linear interaction light, the non-linear interaction light being generated by an interaction between first and second light pulses having respectively first and second discrete spectra, the first and second discrete spectra including respectively first and a second wavelengths, the first and second wavelengths differing from each other. The system includes a first light source for generating the first light pulse in response to receiving a first source trigger and a second light source for generating the second light pulse in response to receiving a second source trigger; a first optical waveguide having a first waveguide length and a second optical waveguide having a second waveguide length, the first optical waveguide transmitting light having the first and second wavelengths respectively at first waveguide first and second wavelength velocities and the second optical waveguide transmitting light having the first and second wavelengths respectively at second waveguide first and second wavelength velocities, the first and second waveguide second wavelength velocities being respectively larger than the first and second waveguide first wavelength velocities; an optical coupling element optically coupled to the first and second light sources and to the first and second optical waveguides for collecting the first and second light pulses from the first and second light sources and splitting the first and second light pulses so that a first portion of the first and second light pulses is transmitted to the first optical waveguide and a second portion of the first and second light pulses is transmitted to the second optical waveguide; a first interaction material optically coupled to the first optical waveguide opposed to the optical coupling element, the first interaction material producing the non-linear interaction light when illuminated substantially simultaneously at the first and second wavelengths; a second interaction material optically coupled to the second optical waveguide opposed to the optical coupling element, the second interaction material producing the non-linear interaction light when illuminated substantially simultaneously at the first and second wavelengths; and a triggering element for generating the first and second source triggers, the triggering element being operatively coupled to the first and second light sources for providing respectively the first and second source triggers thereto, a trigger delay between the first and second source triggers being selectively adjustable such that the second light pulse is produced at one of a first predetermined delay and a second predetermined delay after the first light pulse to cause the first and second light pulses to be separated from each other respectively by the first and second propagation time differentials when arriving at the first and second light guiding elements. The first propagation time differential is equal to the first waveguide length divided by the first waveguide first wavelength velocity, from which is subtracted the first waveguide length divided by the first waveguide second wavelength velocity, and the second propagation time differential is equal to the second waveguide length divided by the second waveguide first wavelength velocity, from which is subtracted the second waveguide length divided by the second waveguide second wavelength velocity. When the first and second light pulses are separated from each other by the first predetermined delay, the non-linear interaction light is produced in the first interaction material, and when the first and second light pulses are separated from each other by the second predetermined delay, the non-linear interaction light is produced in the second interaction material.

In some embodiments of the invention the first and second optical waveguides are optical fibers. For example, the first and second waveguide lengths differ from each other. In a specific example, the first waveguide first and second wavelength velocities are equal respectively to the second waveguide first and second wavelength velocities. In another example, the first and second waveguide lengths are equal to each other, the first and second optical waveguides having different chromatic dispersion properties.

In some embodiments of the invention, at least one of the first and second light sources is a laser.

In some embodiments of the invention, the first and second interaction materials are difference frequency generation (DFG) materials, for example including a periodically poled lithium niobate (PPLN) crystal or a chirped PPLN crystal. In other embodiments of the invention, the first and second interaction materials are sum frequency generation (SFG) materials. In yet other embodiments of the invention, the first and second interaction materials are four wave mixing (FWM) materials.

In some embodiments of the invention, the optical coupling element is a combination optical combiner/optical splitter.

In some embodiments of the invention, the system also includes a first output port optically coupled to the first interaction material for collecting the non-linear interaction light therefrom and releasing the non-linear interaction light, the first output port including a first optical filter absorbing the first and second wavelengths; and a second output port optically coupled to the second interaction material for collecting the non-linear interaction light therefrom and releasing the non-linear interaction light, the second output port including a second optical filter absorbing the first and second wavelengths.

In some embodiments of the invention, the triggering element includes a trigger generator for generating a trigger signal, the trigger generator being connected to the first light source and to the second light source, the triggering element also including a delay element inserted between the trigger generator and the second light source for retarding transmission of the trigger signal, the first source trigger being the trigger signal and the second source trigger being the trigger signal delayed by the delay element.

In another broad aspect, the invention provides a system for spatially addressing the generation of a non-linear interaction light, the non-linear interaction light being generated by an interaction between first and second light pulses having respectively first and second discrete spectra, the first and second discrete spectra including respectively a first wavelength and a second wavelength, the first and second wavelengths differing from each other, The system comprises: a first light source for generating the first light pulse in response to receiving a first source trigger; a second light source for generating the second light pulse in response to receiving a second source trigger; a first light guiding element, the first light guiding element being optically coupled to the first and second light sources for receiving a first pulse first portion of the first light pulse and a second pulse first portion of the second light pulse and propagating the first and second pulse first portions therethrough, the first light guiding element being such that the first and second pulse first portions take respectively first and second pulse first portion propagation times to propagate therethrough, the second pulse first portion propagation time being smaller than the first pulse first portion propagation time by a first propagation time differential; a second light guiding element, the second light guiding element being optically coupled to the first and second light sources for receiving a first pulse second portion of the first light pulse and a second pulse second portion of the second light pulse and propagating the first and second pulse second portions therethrough, the second light guiding element being such that the first and second pulse second portions take respectively first and second pulse second portion propagation times to propagate therethrough, the second pulse second portion propagation time being smaller than the first pulse second portion propagation time by a second propagation time differential; a first interaction material optically coupled to the first light guiding element for receiving the first and second pulse first portions after propagation of the first and second pulse first portions through the first light guiding element, the first interaction material producing the non-linear interaction light when the first and second pulse first portions arrive substantially simultaneously in the first interaction material; a second interaction material optically coupled to the second light guiding element for receiving the first and second pulse second portions after propagation of the first and second pulse second portions through the second light guiding element, the second interaction material producing the non-linear interaction light when the first and second pulse second portions arrive substantially simultaneously in the second interaction material; and a triggering element operatively coupled to the first and second light sources for providing respectively the first and second source triggers thereto, a trigger delay between the first and second source triggers being selectively adjustable between a first predetermined delay and a second predetermined delay. When the first predetermined delay is selected, the second pulse first portion arrives at the first light guiding element after the first pulse first portion and is separated therefrom by the first propagation time differential, and, when the second predetermined delay is selected, the second pulse second portion arrives at the second light guiding element after the first pulse second portion and is separated therefrom by the second propagation time differential. When the first and second light pulses are separated by the first propagation time differential, the non-linear interaction light is produced in the first interaction material, and when the first and second light pulses are separated by the second propagation time differential, the non-linear interaction light is produced in the second interaction material.

In some embodiments of the invention, at least one of the first and second light guiding elements includes an optical fiber optically coupled to the first and second light sources for transmitting respectively the first and second pulse first portions or the first and second pulse second portions therethrough. In other embodiments of the invention, the first light guiding element includes a pair of optical fibers, each optical fiber being optically coupled to a respective one of the first and second light sources for transmitting respectively the first and second pulse first portions therethrough, and/or, the second light guiding element includes a pair of optical fibers, each optical fiber being optically coupled to a respective one of the first and second light sources for transmitting respectively the first and second pulse second portions therethrough.

In another broad aspect, the invention provides a method for selecting a location at which a first light pulse and a second light pulse are synchronized, the method comprising: selecting a selected delay from the group consisting of a first predetermined delay and a second predetermined delay; generating the first light pulse, the first light pulse having a first discrete spectrum, the first discrete spectrum including a first wavelength; generating the second light pulse, the second light pulse having a second discrete spectrum, the second discrete spectrum including a second wavelength differing from the first wavelength, the second light pulse being generated after the first light pulse following the selected delay; propagating a first pulse first portion of the first light pulse and a second pulse first portion of the second light pulse in a first optical waveguide; propagating a first pulse second portion of the first light pulse and a second pulse second portion of the second light pulse in a second optical waveguide. The first optical waveguide is selected to have geometrical and optical properties such the first and second pulse first portions travel through the first optical waveguide in a time equal respectively to a first light first waveguide time and a second light first waveguide time, the second light first waveguide time being equal to the first light first waveguide time minus the first predetermined delay; and the second optical waveguide is selected to have geometrical and optical properties such the first and second pulse second portions travel through the second optical waveguide in a time equal respectively to a first light second waveguide time and a second light second waveguide time, the second light second waveguide time being equal to the first light second waveguide time minus the second predetermined delay. By selecting the first predetermined delay, the first and second light pulses have portions thereof that are synchronous when exiting the first optical waveguide and by selecting the second predetermined delay, the first and second light pulses have portions thereof that are synchronous when exiting the second optical waveguide.

In yet another broad aspect, the invention provides a system for spatially addressing the synchronization of at least first and second light pulses having respectively first and second discrete spectra, the first and second discrete spectra including respectively a first wavelength and a second wavelength, the first and second wavelengths differing from each other, the system comprising: a first light source for generating the first light pulse in response to receiving a first source trigger; a second light source for generating the second light pulse in response to receiving a second source trigger; a first light guiding element, the first light guiding element being optically coupled to the first and second light sources for receiving a first pulse first portion of the first light pulse and a second pulse first portion of the second light pulse and propagating the first and second pulse first portions therethrough, the first light guiding element being such that the first and second pulse first portions take respectively first and second pulse first portion propagation times to propagate therethrough, the second pulse first portion propagation time being smaller than the first pulse first portion propagation time by a first propagation time differential; a second light guiding element, the second light guiding element being optically coupled to the first and second light sources for receiving a first pulse second portion of the first light pulse and a second pulse second portion of the second light pulse and propagating the first and second pulse second portions therethrough, the second light guiding element being such that the first and second pulse second portions take respectively first and second pulse second portion propagation times to propagate therethrough, the second pulse second portion propagation time being smaller than the first pulse second portion propagation time by a second propagation time differential; and a triggering element operatively coupled to the first and second light sources for providing the first and second source triggers thereto, a delay between the first and second source triggers being selectively adjustable between a first predetermined delay and a second predetermined delay. When the first predetermined delay is selected, the second pulse first portion arrives at the first light guiding element after the first pulse first portion and is separated therefrom by the first propagation time differential, and, when the second predetermined delay is selected, the second pulse second portion arrives at the second light guiding element after the first pulse second portion and is separated therefrom by the second propagation time differential. When the first and second pulse first portions are separated by the first propagation time differential, the first and second light pulses have portions thereof that are synchronous when exiting the first light guiding element, and when the first and second pulse second portions are separated by the second propagation time differential, the first and second light pulses have portions thereof that are synchronous when exiting the first light guiding element.

Advantageously, the present invention allows for the generation of the interaction light at many different selectable locations a relatively low costs using commonly available components.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
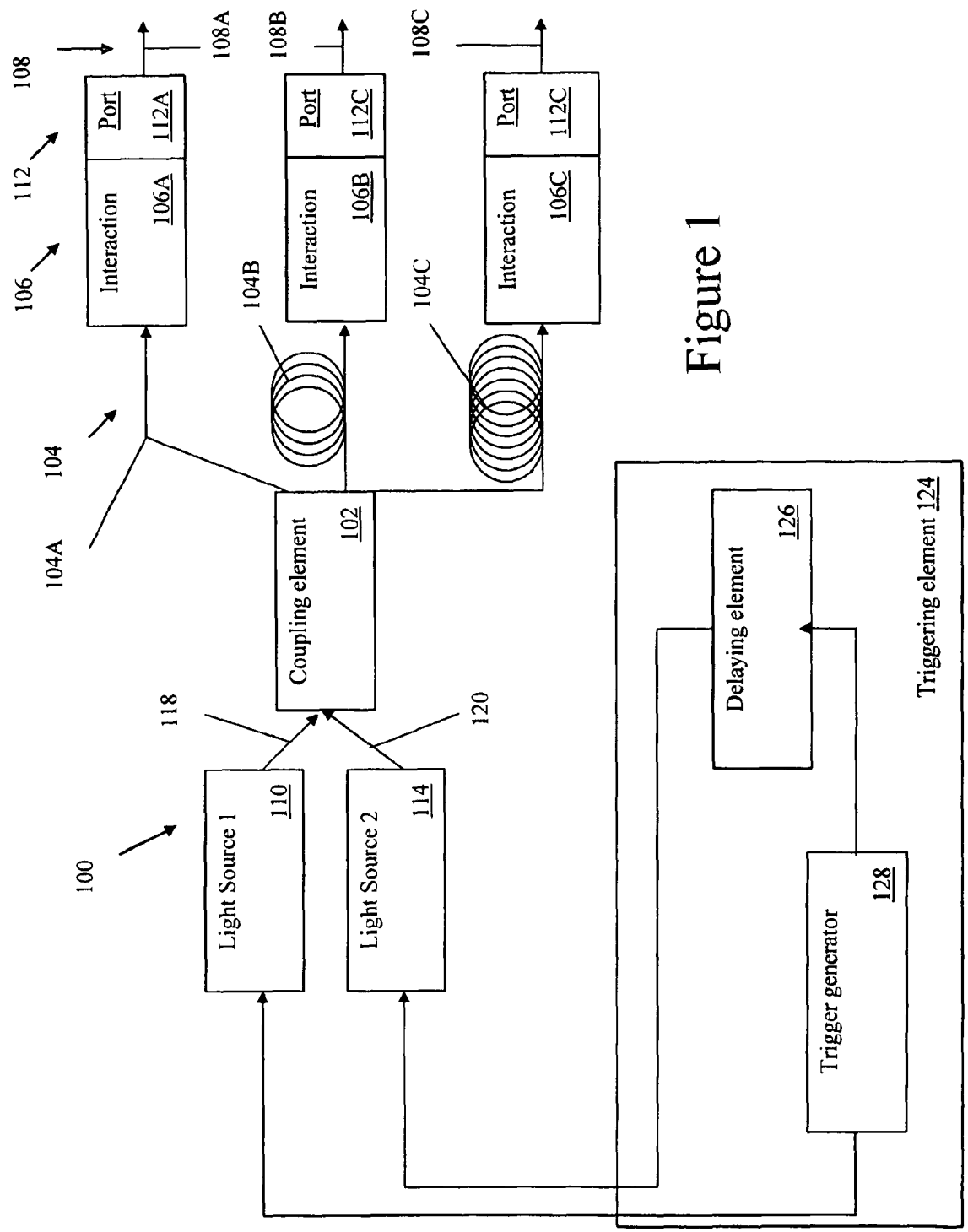
FIG. 1, in a schematic view, illustrates a system in accordance with an embodiment of the present invention.

FIG. 1 illustrates a system 100 for spatially addressing the generation of a non-linear interaction light 108A, 108B or 108C. The non-linear interaction lights 108A, 108B or 108C, which are collectively designated by reference numeral 108, are generated by an interaction between first and second light pulses 118 and 120 having respectively first and second discrete spectra. The first and second discrete spectra include respectively a first wavelength and a second wavelength, the first and second wavelengths differing from each other.

The system 100 includes a first light source 110 and a second light source 114. The system 100 also includes at least two light guiding elements 104A, 104B and 104C, the system 100 illustrated in FIG. 1 including three light guiding elements 104A, 104B and 104C, which are collectively designated by reference numeral 104. The system 100 further includes interaction material 106A, 106B and 106C, which are collectively designated by reference numeral 106. There is one interaction material 106 for each of the light guiding elements 104. In addition, a triggering element 124 is provided. Generally, the system 100 includes two, three or more light guiding elements 104 and interaction materials 106.

The first light source 110 is provided for generating the first light pulse 118 in response to receiving a first source trigger. Similarly, the second light source 114 is provided for generating the second light pulse 120 in response to receiving a second source trigger. The first and second source triggers are generated by the triggering element 124. The triggering element 124 is operatively coupled to the first and second light sources 110 and 114 for providing the first and second source triggers thereto. A trigger delay between the first and second source triggers is selectively adjustable between predetermined delays.

Each light guiding element 104 is optically coupled to the first and second light sources 110 and 114 for receiving a respective first pulse portion of the first light pulse 118 and a respective second pulse portion of the second light pulse 120 and propagating the first and second pulse portions therethrough. Each light guiding element 104 is such that the first and second pulse portions take respective first and second pulse portion propagation times to propagate therethrough, the second pulse portion propagation times being smaller than the first pulse portion propagation times by a respective propagation time differential. The propagation time differentials differ between the light guiding elements 104.

Each interaction material 106 is optically coupled to a respective one of the light guiding elements 104 for receiving the first and second pulse portions after propagation of the first and second pulse portions through the respective light guiding element 104. The interaction materials 106 produce the non-linear interaction light 108 when the first and second pulse portions arrive substantially simultaneously in the interaction materials 106. For the purpose of this document, substantially simultaneous arrival designates a situation in which the first and second light pulses 118 and 120 have portions thereof that arrive to a specific one of the interactions materials 106 to be able to produce the non-linear interaction light 108. The portions of this first and second light pulses 118 and 120 can only partially overlap, or, in cases in which fluorescence or any other delayed light emission characteristic of the interaction material 106 is used, can be completely non-overlapping.

When a predetermined delay corresponding to the predetermined delay of one of the light guiding elements 104 is selected, the second pulse 120 arrives at each light guiding element 104 after the first pulse 118 and is separated therefrom by the propagation time differential corresponding to the one of the light guiding elements 104. Therefore, when the first and second light pulses 118 and 120 are separated by the propagation time differential corresponding to a specific one of the light guiding elements 104, the non-linear interaction light is produced in the interaction material 106 optically coupled to that specific light guiding element 104. It should be noted that in some embodiments of the invention, the trigger delay is not equal to one of the predetermined delays as the trigger delay is selected to also compensate for any delay between the reception of the first and second triggers and the generation of the first and second light pulses 118 and 120. In addition, in cases in which either one or both the first and second light sources 110 and 114 are variable wavelength sources, the trigger delay can also be varied as a function of this wavelength to accommodate differential in pulse production delays caused by wavelength changes.

In some embodiments of the invention, the first and second light sources 110 and 114 are lasers. However, in other embodiments of the invention, the first and second light sources 110 and 114 are any other suitable light sources, such as Light Emitting Diodes (LEDs) or laser diodes, among other possibilities. Also, while the first and second light sources 110 and 114 emit light having respectively the first and second wavelengths, it is within the scope of the invention to have first and second light sources 110 and 114 that emit many wavelengths each. Furthermore, the first and second light sources 110 and 114 do not necessarily have to be of the same type.

The light guiding elements 104 are any suitable components capable of guiding portions of the first and second light pulses 118 and 120 to the interaction materials 106. The light guiding elements 104 have properties such that light having the first and second wavelengths take different times to travel along the light guiding elements 104. For example, the light guiding elements 104 include optical waveguides, such as optical fibers. The optical waveguides are optically coupled to the first and second light sources 110 and 114 at one end thereof and to a respective one of the interaction materials 106 at the other end thereof.

In some embodiments of the invention, each of the light guiding elements 104 includes a single optical fiber through which both the portion of the first and second light pulses 118 and 120 transmitted by the light guiding element 104 propagate. Differences in the propagation delay along the light guiding elements 104 can then be achieved using chromatic dispersion in the optical fibres. In this case, the optical fibers transmit light having the first and second wavelengths respectively at respective first and second wavelength velocities, the second wavelength velocities being larger for each optical fiber than the first wavelength velocities. By having optical fibres of similar composition, and which therefore guide light having the first and second wavelengths at the same velocity between optical fibres, but by having optical fibres of different lengths in the light guiding elements 104, light having first and second wavelengths will be delayed with respect to each other by a different amount in each of the light guiding elements 104. Therefore, by selecting a suitable trigger delay, only one of the light guiding elements 104 will cause substantially simultaneous presence of the first and second light pulses 118 and 120 in one of the interaction materials 106, and only one non-linear interaction light 108 will be produced. The system 10 is therefore able to spatially address, or in other words to select a location for, the generation of the non-linear interaction light 108. In another example, the optical fibres are of identical lengths and the optical fibres have different chromatic dispersion properties, which creates the difference in propagation delay between the optical fibres.

More specifically the propagation time differential between light pulses having the first and second wavelengths is equal to the waveguide length divided by the waveguide first wavelength velocity minus the waveguide length divided by the waveguide second wavelength velocity.

In other embodiments of the invention, each light guiding element 104 includes a pair of optical fibers, each optically coupled to a respective one of the first and second light sources 110 and 114 for transmitting a respective one of the portions of the first and second light pulses 118 and 120. By having different optical properties or different lengths, the difference in propagation times of light at the first and second wavelengths in the light guiding elements 104 can be achieved.

In some embodiments of the invention, optical coupling between the first and second light sources 110 and 114 and the light guiding elements 104 is provided by an optical coupling element 102 optically coupled to the first and second light sources 110 and 114 and to all the light guiding elements 104 for collecting the first and second light pulses 118 and 120 from the first and second light sources 110 and 114 and splitting the first and second light pulses 118 and 120 so that a portion of the first and second light pulses 118 and 120 is transmitted to each of the light guiding elements 104. Typically, the first and second light pulses 118 and 120 are split in portions having substantially similar power in the light guiding elements 104. For example, the optical coupling element 102 is an optical combiner/splitter, typically in the form of a passive optical component. The optical coupling element 102 may also include many sub-components. Manners of achieving the functionality provided by the optical coupling element 102 are well-known in the art and will not be described in further details herein.

In some embodiments of the invention, the interaction materials 106 are difference frequency generation (DFG) materials generating light having a wavelength equal to the difference between the first and second wavelengths. For example, the DFG materials each include a periodically poled lithium niobate (PPLN) crystal or a chirped PPLN crystal, among other possibilities. However, in alternative embodiments of the invention, any other component that combines light at the first and second wavelengths is usable. In yet other embodiments of the invention, an effect other than DFG is used and combination of the portions of the first and second light pulses 118 and 120 is performed in any other suitable manner, for example by sum frequency generation and four wave mixing, among other possibilities. The system 100 is usable for example in airplanes to produce light for missile countermeasures at many different alternatively selectable locations using only one pair of lasers.

It should be noted that in many embodiments, production of the non-linear interaction light is not 100% efficient and part of the first and second light pulses 118 and 120 can exit the interaction materials 106. If needed, this remaining portion of the first and second light pulses 118 and 120 can be filtered. More specifically, in these embodiments, a respective output port 112A, 112B and 112C, collectively designated by reference numeral 112, is optically coupled to each of the interaction materials 106 for collecting the non-linear interaction light therefrom and releasing the non-linear interaction light. The output ports 112 each include an optical filter for absorbing the first and second wavelengths such that no or substantially no light at the wavelengths of the first and second light pulses 118 and 120 exits therefrom.

Also, in some embodiments, the systems 100 includes components to guide the light emitted by the first and second light sources 110 and 114 and by the interaction materials 106. These optical components, for example lenses, mirrors and optical fibres, among other possibilities, have been omitted from the drawings for clarity reasons. The reader skilled in the art will be able to easily select and position such optical components as needed as a function of the disposition and geometry of the for stem 100.

The system 100 includes the triggering element 124 for generating the first and second triggers. In some embodiments of the invention, the first and second triggers are periodically generated such that a pulsed light pattern is emitted by the interaction materials 106. In some embodiments of the invention, the first and second triggers are electrical signals produced by the triggering element 124 and conveyed to the first and second light sources 110 and 114 by an electrical conductor of wirelessly. In other embodiments of the invention, the first and second triggers are optical signals produced by the triggering element 124 and conveyed to the first and second light sources 110 and 114 by optical fibers or in any other suitable manner.

For example, the triggering element 124 includes a trigger generator 128 connected to the first light source 110 and to the second light source 114, a delay element 126 being inserted between the trigger generator 128 and the second light source 114 for providing the trigger delay by retarding transmission of the second trigger. The trigger generator therefore provides the first source trigger and the delay element 126 provides the second source trigger. The delay element 126 can be any suitable elements, such as passive or an active electrical or electronic circuit, a digital logic component or a transmission line, among other possibilities.

The trigger signals may have any suitable shape. In some embodiments of the invention, the trigger signals are square impulsions of predetermined magnitude and duration. Components that can generate suitable trigger signals are well-known in the art and will not be described in further details herein.

Although the system 100 includes two light sources, any other suitable number of light sources is usable, the number of triggers generated depending on the number of light sources.

Figure 2:
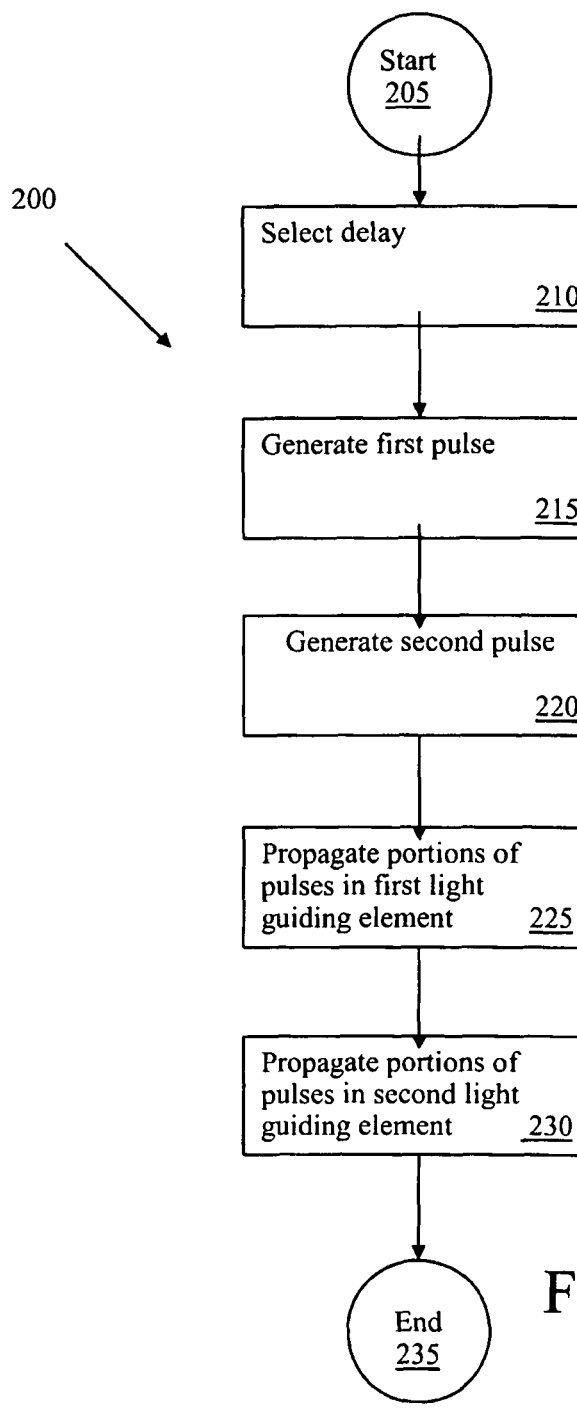
FIG. 2, in a flowchart, illustrates a method performed by the system shown in FIG. 1.

Referring to FIG. 2, the system 110 is usable to implement a method 200 for selecting a location at which the first light pulse 118 and the second light pulse 120 are synchronized. The method starts at step 205. Then, at step 210, a selected delay is selected from a group including predetermined delays. Afterward, at step 215, the first light pulse 118 is generated, for example using the first light source 110. Subsequently, at step 220, the second light pulse 120 is generated, for example using the second light source 114.

Then, at step 225, a first pulse first portion of the first light pulse 118 and a second pulse first portion of the second light pulse 120 are propagated in a first optical waveguide, which is for example part of the light guiding element 104A. Also, at step 230, a first pulse second portion of the first light pulse 118 and a second pulse second portion 120 of the second light pulse 120 are propagated in a second optical waveguide, for example part of the light guiding element 1048. At this point, the method ends at step 230. The first optical waveguide is selected to have geometrical and optical properties such the first and second pulse first portions travel through the first optical waveguide in a time equal respectively to a first light first waveguide time and a second light first waveguide time, the second light first waveguide time being equal to the first light first waveguide time minus the first predetermined delay, and the second optical waveguide is selected to have geometrical and optical properties such the first and second pulse second portions travel through the second optical waveguide in a time equal respectively to a first light second waveguide time and a second light second waveguide time, the second light second waveguide time being equal to the first light second waveguide time minus the second predetermined delay. By selecting the first predetermined delay, the first and second light pulses 118 and 120 have portions thereof that are synchronous when exiting the first optical waveguide and by selecting the second predetermined delay, the first and second light pulses have portions thereof that are synchronous when exiting the second optical waveguide. The thus synchronized pulse portions can be used in many manners, for example to produce non-linear interaction light as in the system 100.

Although the present invention has been described hereinabove by way of preferred embodiments thereof, it can be modified, without departing from the spirit and nature of the subject invention as defined in the appended claims.

What is claimed is:

1. A system for spatially addressing generation of a non-linear interaction light, said non-linear interaction light being generated by an interaction between first and second light pulses having respectively first and second spectra, said first and second discrete spectra including respectively first and a second wavelengths, said first and second wavelengths differing from each other, said system comprising:

a first light source for generating said first light pulse in response to receiving a first source trigger and a second light source for generating said second light pulse in response to receiving a second source trigger;

a first optical waveguide having a first waveguide length and a second optical waveguide having a second waveguide length, said first optical waveguide transmitting light having said first and second wavelengths respectively at first waveguide first and second wavelength velocities and said second optical waveguide transmitting light having said first and second wavelengths respectively at second waveguide first and second wavelength velocities, said first and second waveguide second wavelength velocities being respectively larger than said first and second waveguide first wavelength velocities;

an optical coupling element optically coupled to said first and second light sources and to said first and second optical waveguides for collecting said first and second light pulses from said first and second light sources and splitting said first and second light pulses so that a first portion of said first and second light pulses is transmitted to said first optical waveguide and a second portion of said first and second light pulses is transmitted to said second optical waveguide;

a first interaction material optically coupled to said first optical waveguide opposed to said optical coupling element, said first interaction material producing said non-linear interaction light when illuminated substantially simultaneously at said first and second wavelengths;

a second interaction material optically coupled to said second optical waveguide opposed to said optical coupling element, said second interaction material producing said non-linear interaction light when illuminated substantially simultaneously at said first and second wavelengths; and a triggering element for generating said first and second source triggers, said triggering element being operatively coupled to said first and second light sources for providing respectively said first and second source triggers thereto, a trigger delay between said first and second source triggers being selectively adjustable such that said second light pulse is produced at one of a first predetermined delay and a second predetermined delay after said first light pulse to cause said first and second light pulses to be separated from each other respectively by first and second propagation time differentials when arriving at said first and second light guiding elements;

wherein said first propagation time differential is equal to said first waveguide length divided by said first waveguide first wavelength velocity, from which is subtracted said first waveguide length divided by said first waveguide second wavelength velocity, and said second propagation time differential is equal to said second waveguide length divided by said second waveguide first wavelength velocity, from which is subtracted said second waveguide length divided by said second waveguide second wavelength velocity;

whereby, when said first and second light pulses are separated from each other by said first predetermined delay, said non-linear interaction light is produced in said first interaction material, and when said first and second light pulses are separated from each other by said second predetermined delay, said non-linear interaction light is produced in said second interaction material.

2. A system as defined in claim 1, wherein said first and second optical waveguides are optical fibers.

3. A system as defined in claim 1, wherein said first and second waveguide lengths differ from each other.

4. A system as defined in claim 3, wherein said first waveguide first and second wavelength velocities are equal respectively to said second waveguide first and second wavelength velocities.

5. A system as defined in claim 1, wherein said first and second waveguide lengths are equal to each other, said first and second optical waveguides having different chromatic dispersion properties.

6. A system as defined in claim 1, wherein at least one of said first and second light sources is a laser.

7. A system as defined in claim 1, wherein said first and second interaction materials are difference frequency generation (DFG) materials.

8. A system as defined in claim 7, wherein said DFG materials each include a periodically poled lithium niobate (PPLN) crystal or a chirped PPLN crystal.

9. A system as defined in claim 1, wherein said first and second interaction materials are sum frequency generation (SFG) materials.

10. A system as defined in claim 1, wherein said first and second interaction materials are four wave mixing (FWM) materials.

11. A system as defined in claim 1, wherein said optical coupling element is a combination optical combiner/optical splitter.

12. A system as defined in claim 1, further comprising
a first output port optically coupled to said first interaction material for collecting said non-linear interaction light therefrom and releasing said non-linear interaction light, said first output port including a first optical filter absorbing said first and second wavelengths; and
a second output port optically coupled to said second interaction material for collecting said non-linear interaction light therefrom and releasing said non-linear interaction light, said second output port including a second optical filter absorbing said first and second wavelengths.

13. A system as defined in claim 1, wherein said triggering element includes a trigger generator for generating a trigger signal, said trigger generator being connected to said first light source and to said second light source, said triggering element also including a delay element inserted between said trigger generator and said second light source for retarding transmission of said trigger signal, said first source trigger being said trigger signal and said second source trigger being said trigger signal delayed by said delay element.

14. A system for spatially addressing the generation of a non-linear interaction light, said non-linear interaction light being generated by an interaction between first and second light pulses having respectively first and second discrete spectra, said first and second discrete spectra including respectively a first wavelength and a second wavelength, said first and second wavelengths differing from each other, said system comprising:
a first light source for generating said first light pulse in response to receiving a first source trigger;
a second light source for generating said second light pulse in response to receiving a second source trigger;
a first light guiding element, said first light guiding element being optically coupled to said first and second light sources for receiving a first pulse first portion of said first light pulse and a second pulse first portion of said second light pulse and propagating said first and second pulse first portions therethrough, said first light guiding element being such that said first and second pulse first portions take respectively first and second pulse first portion propagation times to propagate therethrough, said second pulse first portion propagation time being smaller than said first pulse first portion propagation time by a first propagation time differential;
a second light guiding element, said second light guiding element being optically coupled to said first and second light sources for receiving a first pulse second portion of said first light pulse and a second pulse second portion of said second light pulse and propagating said first and second pulse second portions therethrough, said second light guiding element being such that said first and second pulse second portions take respectively first and second pulse second portion propagation times to propagate therethrough, said second pulse second portion propagation time being smaller than said first pulse second portion propagation time by a second propagation time differential;
a first interaction material optically coupled to said first light guiding element for receiving said first and second pulse first portions after propagation of said first and second pulse first portions through said first light guiding element, said first interaction material producing said non-linear interaction light when said first and second pulse first portions arrive substantially simultaneously in said first interaction material;
a second interaction material optically coupled to said second light guiding element for receiving said first and second pulse second portions after propagation of said first and second pulse second portions through said second light guiding element, said second interaction material producing said non-linear interaction light when said first and second pulse second portions arrive substantially simultaneously in said second interaction material;
a triggering element operatively coupled to said first and second light sources for providing respectively said first and second source triggers thereto, a trigger delay between said first and second source triggers being selectively adjustable between a first predetermined delay and a second predetermined delay;
wherein, when said first predetermined delay is selected, said second pulse first portion arrives at said first light guiding element after said first pulse first portion and is separated therefrom by said first propagation time differential, and, when said second predetermined delay is selected, said second pulse second portion arrives at said second light guiding element after said first pulse second portion and is separated therefrom by said second propagation time differential;

whereby, when said first and second light pulses are separated by said first propagation time differential, said non-linear interaction light is produced in said first interaction material, and when said first and second light pulses are separated by said second propagation time differential, said non-linear interaction light is produced in said second interaction material.

15. A system as defined in claim 14, wherein at least one of said first and second light guiding elements includes an optical fiber optically coupled to said first and second light sources for transmitting respectively said first and second pulse first portions or said first and second pulse second portions therethrough.

16. A system as defined in claim 14, wherein said first light guiding element includes a pair of optical fibers, each optical fiber being optically coupled to a respective one of said first and second light sources for transmitting respectively said first and second pulse first portions therethrough.

17. A system as defined in claim 14, wherein said second light guiding element includes a pair of optical fibers, each optical fiber being optically coupled to a respective one of said first and second light sources for transmitting respectively said first and second pulse second portions therethrough.

18. A method for selecting a location at which a first light pulse and a second light pulse are synchronized, said method comprising:
   selecting a selected delay from the group consisting of a first predetermined delay and a second predetermined delay;
   generating said first light pulse, said first light pulse having a first discrete spectrum, said first discrete spectrum including a first wavelength;
   generating said second light pulse, said second light pulse having a second discrete spectrum, said second discrete spectrum including a second wavelength differing from said first wavelength, said second light pulse being generated after said first light pulse following said selected delay;
   propagating a first pulse first portion of said first light pulse and a second pulse first portion of said second light pulse in a first optical waveguide;
   propagating a first pulse second portion of said first light pulse and a second pulse second portion of said second light pulse in a second optical waveguide;
   wherein
      said first optical waveguide is selected to have geometrical and optical properties such said first and second pulse first portions travel through said first optical waveguide in a time equal respectively to a first light first waveguide time and a second light first waveguide time, said second light first waveguide time being equal to said first light first waveguide time minus said first predetermined delay; and
      said second optical waveguide is selected to have geometrical and optical properties such said first and second pulse second portions travel through said second optical waveguide in a time equal respectively to a first light second waveguide time and a second light second waveguide time, said second light second waveguide time being equal to said first light second waveguide time minus said second predetermined delay;
   whereby by selecting said first predetermined delay, said first and second light pulses have portions thereof that are synchronous when exiting said first optical waveguide and by selecting said second predetermined delay, said first and second light pulses have portions thereof that are synchronous when exiting said second optical waveguide.

19. A system for spatially addressing the synchronization of at least first and second light pulses having respectively first and second discrete spectra, said first and second discrete spectra including respectively a first wavelength and a second wavelength, said first and second wavelengths differing from each other, said system comprising:
   a first light source for generating said first light pulse in response to receiving a first source trigger;
   a second light source for generating said second light pulse in response to receiving a second source trigger;
   a first light guiding element, said first light guiding element being optically coupled to said first and second light sources for receiving a first pulse first portion of said first light pulse and a second pulse first portion of said second light pulse and propagating said first and second pulse first portions therethrough, said first light guiding element being such that said first and second pulse first portions take respectively first and second pulse first portion propagation times to propagate therethrough, said second pulse first portion propagation time being smaller than said first pulse first portion propagation time by a first propagation time differential;
   a second light guiding element, said second light guiding element being optically coupled to said first and second light sources for receiving a first pulse second portion of said first light pulse and a second pulse second portion of said second light pulse and propagating said first and second pulse second portions therethrough, said second light guiding element being such that said first and second pulse second portions take respectively first and second pulse second portion propagation times to propagate therethrough, said second pulse second portion propagation time being smaller than said first pulse second portion propagation time by a second propagation time differential; and
   a triggering element operatively coupled to said first and second light sources for providing said first and second source triggers thereto, a delay between said first and second source triggers being selectively adjustable between a first predetermined delay and a second predetermined delay;
   wherein, when said first predetermined delay is selected, said second pulse first portion arrives at said first light guiding element after said first pulse first portion and is separated therefrom by said first propagation time differential, and, when said second predetermined delay is selected, said second pulse second portion arrives at said second light guiding element after said first pulse second portion and is separated therefrom by said second propagation time differential;
   whereby, when said first and second pulse first portions are separated by said first propagation time differential, said first and second light pulses have portions thereof that are synchronous when exiting said first light guiding element, and when said first and second pulse second portions are separated by said second propagation time differential, said first and second light pulses have portions thereof that are synchronous when exiting said second light guiding element.

* * * * *